No. 730,668. PATENTED JUNE 9, 1903.
A. LIPSCHUTZ.
RIGID ARCH BAR TRUCK.
APPLICATION FILED JAN. 2, 1903.
NO MODEL. 2 SHEETS—SHEET 1.
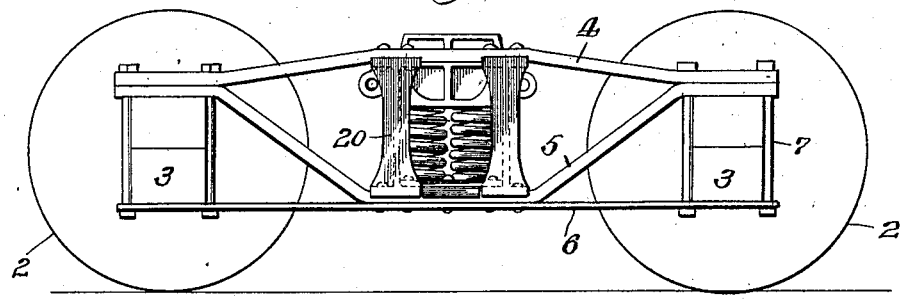
Fig. 1
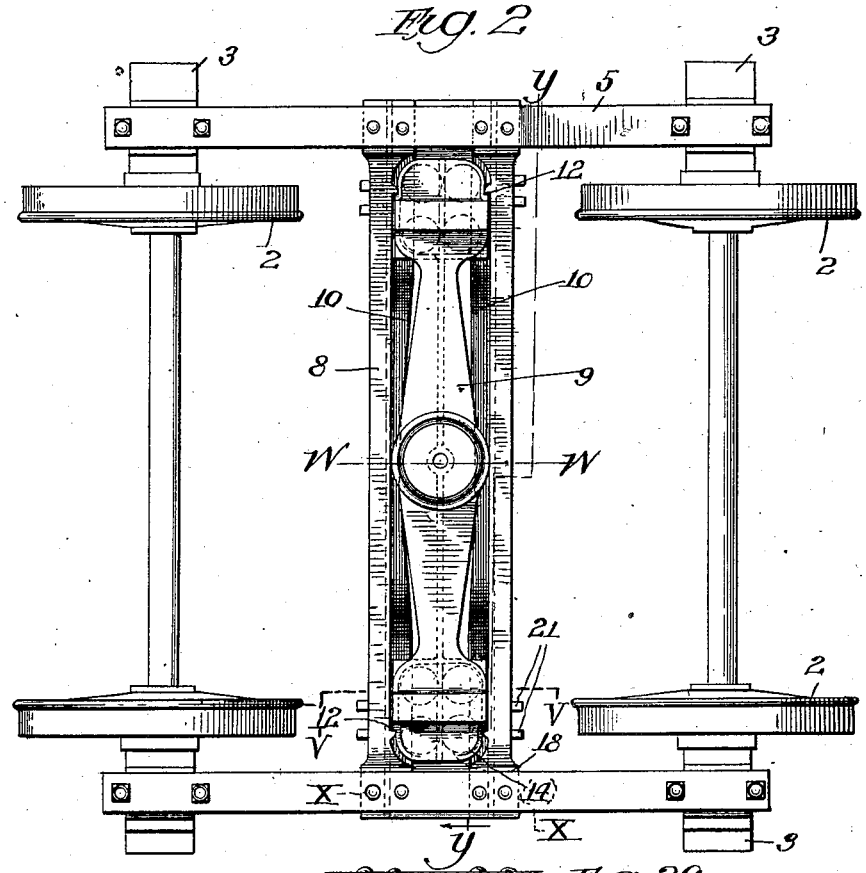
Fig. 2
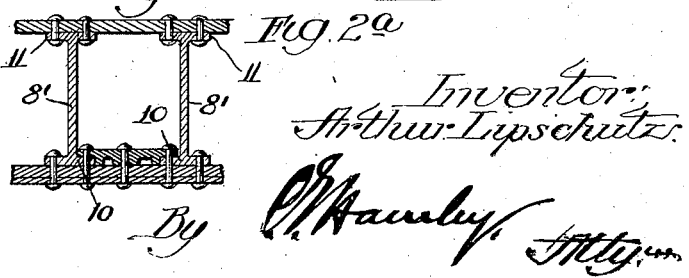
Fig. 2ª
Witnesses: Inventor:
Arthur Lipschutz
By

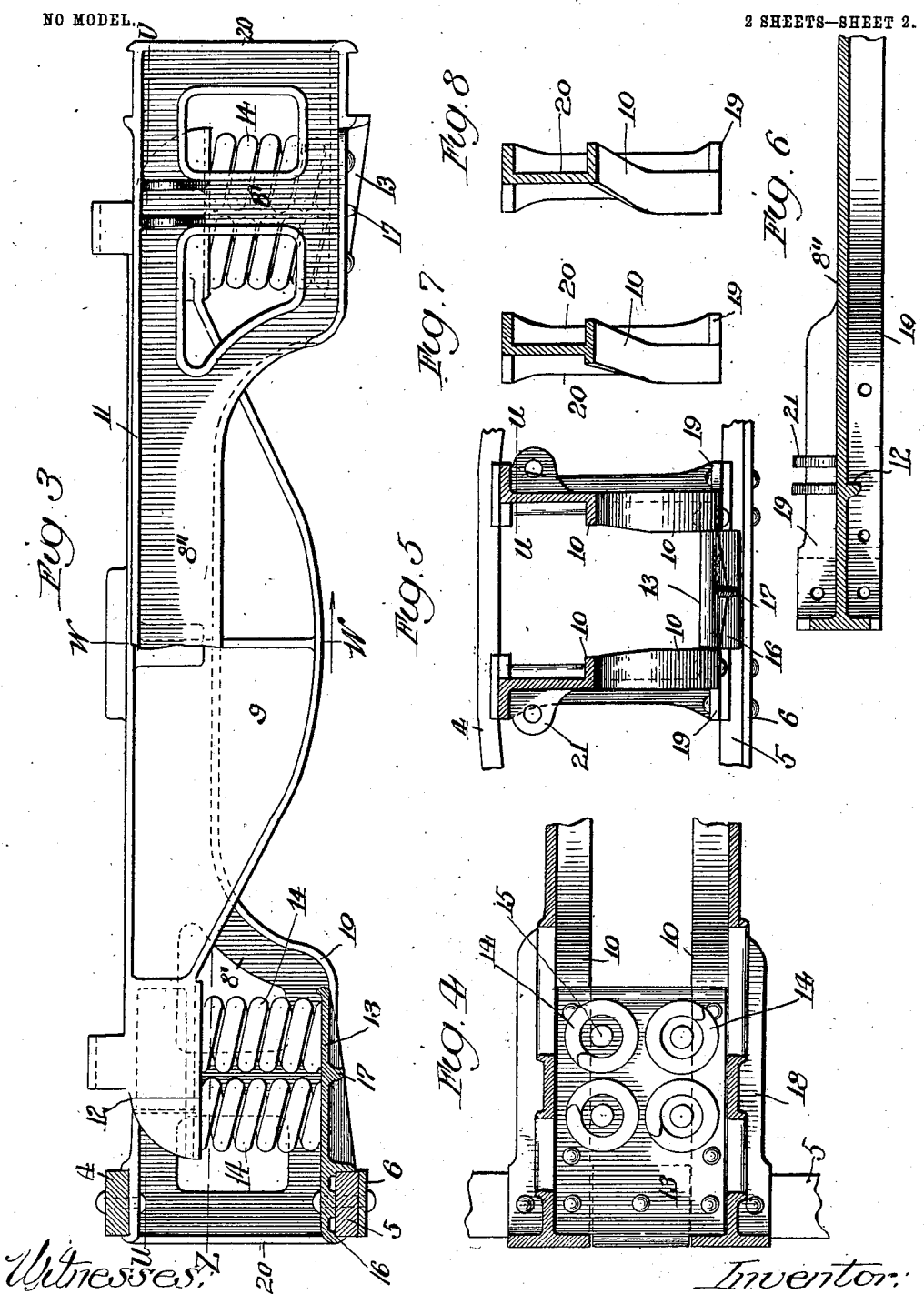

No. 730,668. Patented June 9, 1903.

UNITED STATES PATENT OFFICE.

ARTHUR LIPSCHUTZ, OF ST. LOUIS, MISSOURI.

RIGID ARCH-BAR TRUCK.

SPECIFICATION forming part of Letters Patent No. 730,668, dated June 9, 1903.

Application filed January 2, 1903. Serial No. 137,506. (No model.)

*To all whom it may concern:*

Be it known that I, ARTHUR LIPSCHUTZ, a citizen of the United States, and a resident of the city of St. Louis, State of Missouri, have invented a certain new and useful Improved Rigid Arch-Bar Truck, of which the following is a specification.

My invention relates to railroad-car trucks, and has special reference to rigid trucks for freight-cars. Such trucks comprise rigid sides that are composed of the arch-bars and stay-bars and which are provided with means for their rigid attachment to the journal-boxes. These arch-bar sides are commonly connected by channel-beams of uniform cross-section and between which the truck-bolster is supported upon the springs. These rigid arch-bar trucks are of complicated construction, are heavy, and are costly to manufacture.

The object of my invention is to provide a rigid arch-bar truck that shall possess great rigidity, that shall be of economical construction, that shall have fewer parts than the ordinary truck, that shall be easy to assemble in manufacture and also easy to repair, and that shall be of less weight than other trucks of equal strength.

My invention consists generally in a rigid arch-bar truck wherein the arch-bar sides of the truck are rigidly connected by transoms that are Z-shaped in cross-section and which have inwardly-extending lower flanges, suitable means being provided between said transoms for supporting a bolster.

My invention further consists in a rigid arch-bar truck that is provided with parallel transoms secured to the arch-bars and of varying cross-section, means being provided between said transom for the support of the bolster; and my invention further consists in a rigid arch-bar truck wherein the arch-bar sides of the truck are connected by two parallel cast-metal transoms that are Z-shaped in cross-section and carry spring-seats for the bolster-springs; and my invention further consists in a rigid arch-bar truck wherein the parallel transoms are provided with inwardly-extending bottom flanges in combination with spring-seats resting and secured upon said flanges at the ends of said transoms; and, further, my invention consists in a rigid arch-bar truck wherein the parallel transoms are provided with bolster-stops upon their inner sides near their ends; and, further, my invention consists in various constructions and in combinations of parts, all in a freight-car or rigid arch-bar truck, as hereinafter described, and particularly pointed out in the claims.

My invention will be more readily understood by reference to the accompanying drawings, forming a part of this specification, and in which—

Figure 1 is a side elevation of a rigid arch-bar truck embodying my invention. Fig. 2 is a plan view thereof. Fig. 2ª is a vertical section on the line $x\ x$ of Fig. 2. Fig. 3 in an enlarged cross-section of the truck substantially on the line $y\ y$ of Fig. 2 and showing the form and construction of the transom in detail. Fig. 4 is a detail horizontal section on the line $z$ of Fig. 3. Fig. 5 is a vertical section on the lines $w\ w$ of Figs. 2 and 3, the bolster being removed. Fig. 6 is a horizontal section of one of the transoms upon a line just beneath the top flange thereof, as upon line $u$ of Fig. 3. Fig. 7 is a vertical cross-section of a modified form of the transom; and Fig. 8 is a similar view illustrating a further modification thereof.

As shown in the drawings, 2 2 represent the wheels of the truck, the axles of which are journaled in the boxes 3.

4 represents the top arch-bar, 5 the bottom arch-bar, and 6 the stay-bar. The boxes 3 are held by the usual column-bolts 7. The essential features of my invention reside in the transom structure by which the two sides of the truck are joined. This structure is mainly composed of the parallel transoms 8 8. These are preferably identical in form, but occupy reverse positions. The transoms may be simple rolled-steel Z-bars having deep webs; but I much prefer to employ transoms of cast-steel, whereby I am enabled to vary the cross-section of the Z-bars and make considerable savings in their cost and weight. I will therefore describe my invention as embodied in the form which I consider to be the best, judged from both theoretical and commercial standpoints.

The purpose of the transom structure is to tie the sides of the truck together, to guide the truck-bolster, and assist in the support of the same and the car-body. The bolster 9 is placed between the transom, but is of less length, as it must play between the sides of the truck. The distance between the transoms is practically determined by the width of the bolster, the bolster being wide enough at the ends to engage the inner sides of the transoms. The bolster is supported by springs that are arranged beneath its ends and which are provided with seats between the ends of the transoms. These spring-seats as commonly arranged involve complicated and heavy constructions and, furthermore, do not materially increase the rigidity of the transom structure. It is difficult to attach the same to the usual channel-shaped transoms, and when the seats are formed integrally with the transoms the structure is made too expensive, too heavy, and too difficult to repair, the costs of manufacture and maintenance being prohibitive.

The disadvantages and objections that are inherent to other structures are avoided in my invention, briefly, as follows: by the use of metal transoms that are provided with integral inwardly-extending flanges 10 10 at their lower edges and ends to receive and sustain the spring-seats and by the use of metal transoms that are separately secured to the arch-bars of the truck and which are identical in form and construction, and are therefore reversible, and by use of metal transoms of arch form and by the use of spring-seats, which though separable from the transoms serve to rigidly connect the same together and with the lower arch-bars when built into the structure.

Referring to the drawings, it will be seen that each transom in its preferred form is an integral steel casting. Each comprises a vertical web, which is of much greater depth at the end portions 8' than in the middle portion 8'' of the transom. Less strength is required at the middle of the transom than at the ends, and its lower part may therefore be cut away or reduced. The top flange 11 of the transom extends outwardly and affords the necessary strength without interfering with the bolster. The lower flanges 10 at the ends of the transom extend inwardly, as explained, and thus the transom is made substantially Z-shaped in cross-section. The lower flanges 10 may, if desired, extend from end to end of the transom, as shown in Figs. 2 and 3. In this case the highest portions of the bottom flanges 10 will not interfere with the depression of the bolster between the transom—that is, the bolster-springs when completely collapsed by the full depression of the bolster will serve to stop the bolster before its upper flanges reach the tops of the flange-arches 10. The inner sides of the transoms are provided with integral vertical ribs or stops 12, which permit the vertical movement of the bolster, but prevent endwise movement thereof between the transoms. These take the place of the end stops that are usually arranged between the transoms at the ends of the bolster.

13 13 are two short spring seats or plates, which rest upon the flanges 10 between the ends of the parallel transoms. These are bolted or riveted to the flanges 10, as shown, and may, if desired, be provided with vertical side flanges secured to the webs of the transoms. These spring-seats 13 extend outwardly over the lower arch-bars and are riveted or bolted thereto, as well as to the transoms, giving great rigidity to the structure, which at each end is made up of the arch-bars, the transoms, and the spring seat or plate all firmly riveted or bolted together. The bolster-springs 14 rest upon the spring-piece 13 and are held in place by suitable bosses 15, provided on the upper surfaces of the spring-seats. The spring-seats are preferably steel castings that have flanges 16 to fit over the lower arch-bars. They are also provided with strengthening-ribs 17 on their under surface.

The bottom flanges 10 of the transoms may be preserved for the full length of the transoms and yet not extend beneath the wide middle portion of the bolster. Such forms are shown in Figs. 7 and 8, where the bottom flange 10 is shifted outwardly to be partly or wholly upon the outer side of the transom along the middle portion thereof. In short, any suitable disposition may be made of the metal at the middle of the transom, so long as the Z-section shapes are preserved at the ends of the transom.

It is obvious that numerous modifications of my invention will readily suggest themselves to one skilled in the art, and I therefore do not confine my invention to the specific constructions herein shown and described.

Having thus described my invention, I claim as new and desire to secure by Letters Patent—

1. The parallel transoms, comprising the metal bars provided at their ends with inwardly-extending bottom flanges and outwardly-extending top flanges, in combination with the spring-seats resting upon said flanges and rigidly connecting said bars, substantially as described.

2. The parallel metal transoms, Z-shaped in cross-section, with inwardly-extending bottom flanges and outwardly-extending top flanges, in combination with the top and bottom arch-bars, whereto said transoms are rigidly secured, and the spring seats or plates secured upon the bottom arch-bars and extending inwardly upon said bottom flanges, at opposite ends of the transoms, substantially as described.

3. In a rigid arch-bar car-truck, the truck arch-bars, in combination with the parallel cast-steel transoms of varying cross-section and provided with inwardly-extending bottom flanges and outwardly-extending top flanges, said transoms at their ends being secured to said arch-bars and the spring-seats secured upon said flanges and to the bottom arch-bars, substantially as described.

4. The parallel cast-steel transoms of varying cross-section, provided with outwardly-extending top flanges and with continuous bottom flanges that extend inwardly at the ends of the transoms, in combination with the spring-seats and the arch-bars.

5. In a rigid arch-bar truck, the combination of the arch-bars with the parallel cast-steel transoms, secured to said arch-bars and provided with vertical ribs or bolster-stops on their inner sides, said transoms having outwardly-extending top flanges and inwardly-extending bottom flanges, the spring-seats secured upon said bottom flanges between the ends of the transoms and also secured to the lower arch-bars, substantially as described.

6. The parallel cast-steel transoms that are I-shaped in cross-section at their extreme ends, that are Z-shaped in cross-section near their ends and of any suitable cross-section in their middle portions, in combination with suitable spring-seats, bolster-stops and arch-bars, substantially as described.

In witness whereof I have hereunto set my hand this 16th day of December, 1902, at St. Louis, Missouri.

ARTHUR LIPSCHUTZ.

In presence of—
  CHAS. AHIDDLE,
  IRA J. PERRY.